United States Patent [19]

Jaques

[11] Patent Number: 4,718,820
[45] Date of Patent: Jan. 12, 1988

[54] PUMPING APPARATUS

[76] Inventor: Robert K. Jaques, Rt. 5, 90-A, Florence, Miss. 39073

[21] Appl. No.: 61,729

[22] Filed: Jun. 15, 1987

Related U.S. Application Data

[63] Continuation of Ser. No. 901,724, Aug. 29, 1986, abandoned.

[51] Int. Cl.$^4$ ............................................. F04D 29/10
[52] U.S. Cl. ..................................... 415/174; 277/27; 277/152; 277/226; 384/486
[58] Field of Search ............... 415/170 R, 170 A, 173, 415/174; 277/27, 152, 226, 205, 206 R; 384/485, 486

[56] References Cited

U.S. PATENT DOCUMENTS

| | | | |
|---|---|---|---|
| 2,684,033 | 7/1954 | Montgomery et al. | 415/170 A |
| 2,731,282 | 1/1956 | McManus et al. | 415/170 A |
| 3,134,331 | 5/1964 | Huber | 415/170 A |
| 3,544,116 | 12/1970 | Peterson | 415/170 A |
| 3,625,578 | 12/1971 | Loftis et al. | 384/486 |
| 3,748,003 | 7/1973 | Barbar | 384/486 |
| 3,869,181 | 3/1975 | Barbar | 384/486 |
| 4,179,130 | 12/1979 | Fass et al. | 277/84 |

FOREIGN PATENT DOCUMENTS 499797  11/1954  Italy ................................. 415/174

*Primary Examiner*—Robert E. Garrett
*Assistant Examiner*—John T. Kwon
*Attorney, Agent, or Firm*—Pravel, Gambrell, Hewitt, Kimball & Krieger

[57] ABSTRACT

A fluid pump apparatus having on its first end a motor for power driving an elongated shaft, the shaft portion housed in a pump housing, with an impeller on the second end for routing fluid from an inlet to an outlet port. Toward its first end, the shaft is supported and rotates on a pair of oil bearings housed in an oil bath, for effecting rotation during the pumping action. On the second end, the improved apparatus further comprises a third set of bearings housed on that portion of the shaft adjacent the impeller blade, between the pump housing and the shaft. There is further provided a pair of angular rubber grease seals on either set of the bearings wherein grease injected into the cavity housing the bearings and grease seals fills a void between each pair of grease seals so that the seal members are moved into a rigid sealing position between the shaft and the housing. The components of the third set of bearings and grease seals replace the packing material, and in addition to effecting a more consistent seal to disallow mud into the area, also provide a stable mounting for that portion of the shaft, and reduce or totally eliminate any flexing which may occur in the shaft, and thus greatly improve the life of the pump.

3 Claims, 3 Drawing Figures

PUMPING APPARATUS

This is a continuation of application Ser. No. 901,724, filed Aug. 29, 1986, now abandoned.

BACKGROUND OF THE INVENTION

1. Field of the Invention

The apparatus of the present invention relates to fluid pumps. More particularly, the present invention relates to an improvement in a fluid pump providing improved sealing capability against the potential leakage of fluid onto the pump shaft.

2. General Background

At present, various types of pumps are utilized in the oil and gas industry for pumping mud or other compounds at the rig site. One such type of pump is a pump of the type manufactured by Dimco which utilizes an impeller blade for receiving and impelling fluid out of a flowline into a fluid pit or the like. The design of the Dimco pump is such that the pump shaft extending outward from the pump motor to the impeller blade is housed within a pair of oil bearings at a first end and a packing gland adjacent the impeller blade to help reduce the possibility of mud leaking into the oil bearing area. However, the packing gland on such a pump which resides between the pump housing and the shaft, is of a material which is somewhat resilient and subject to wear. Therefore, when fluid, mud or the like does in fact seep into the backside of the impeller blade in contact with the packing material, due to the property of the mud, i.e., having particles or the like therein, the packing gland is worn away from the shaft. When this occurs, the shaft is therefore allowed to flex during the pumping action, which is detrimental to the life of the shaft and ultimately to the life of the pump. In fact, the life of such a pump is approximately one year, after which time the pump components must be replaced due to wear of the packing gland.

SUMMARY OF THE PRESENT INVENTION

The improved pump apparatus of the present invention solves the problems presently confronted in the art in a simple and straightforward manner. What is provided is a fluid pump apparatus having on its first end a motor for power driving an elongated shaft, the shaft portion housed in a pump housing, with an impeller on the second end for routing fluid from an inlet to an outlet port. Toward its first end, the shaft is supported and rotates on a pair oil bearings housed in an oil bath, for effecting rotation during the pumping action. On the second end, the improved apparatus further comprises a third set of bearings housed on that portion of the shaft adjacent the impeller blade, between the pump housing and the shaft. There is further provided a pair of angular rubber grease seals on either set of the bearings wherein grease injected into the cavity housing the bearings and grease seals fills a void between each pair of grease seals so that the seal members are moved into a rigid sealing position between the shaft and the housing. The components of the third set of bearings and grease seals replace the packing material, and in addition to effecting a more consistent seal to disallow mud into the area, also provide a stable mounting for the portion of the shaft, and reduce a totally eliminate any flexing which may occur in the shaft, and thus greatly improve the life of the pump.

Therefore, it is an object of the present invention to provide an improved mud pump apparatus.

It is a further object of the present invention to provide a pump apparatus utilizing a set of bearings and grease seals in place of a packing gland in the apparatus.

It is still a further object of the present invention to provide an improved pump apparatus for eliminating any flexing of the shaft of the pump during the pumping action.

It is still a further object of the present invention to provide a pump apparatus utilizing grease seals for maintaining a relatively fluid type seal between the pump shaft and the sealing member.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and, wherein:

FIG. 3 is a blow-up view of the grease seals in the first unsealing position before being filled with grease.

DETAILED DESCRIPTION OF THE PREFERRED EMBODIMENT

Figure 1:
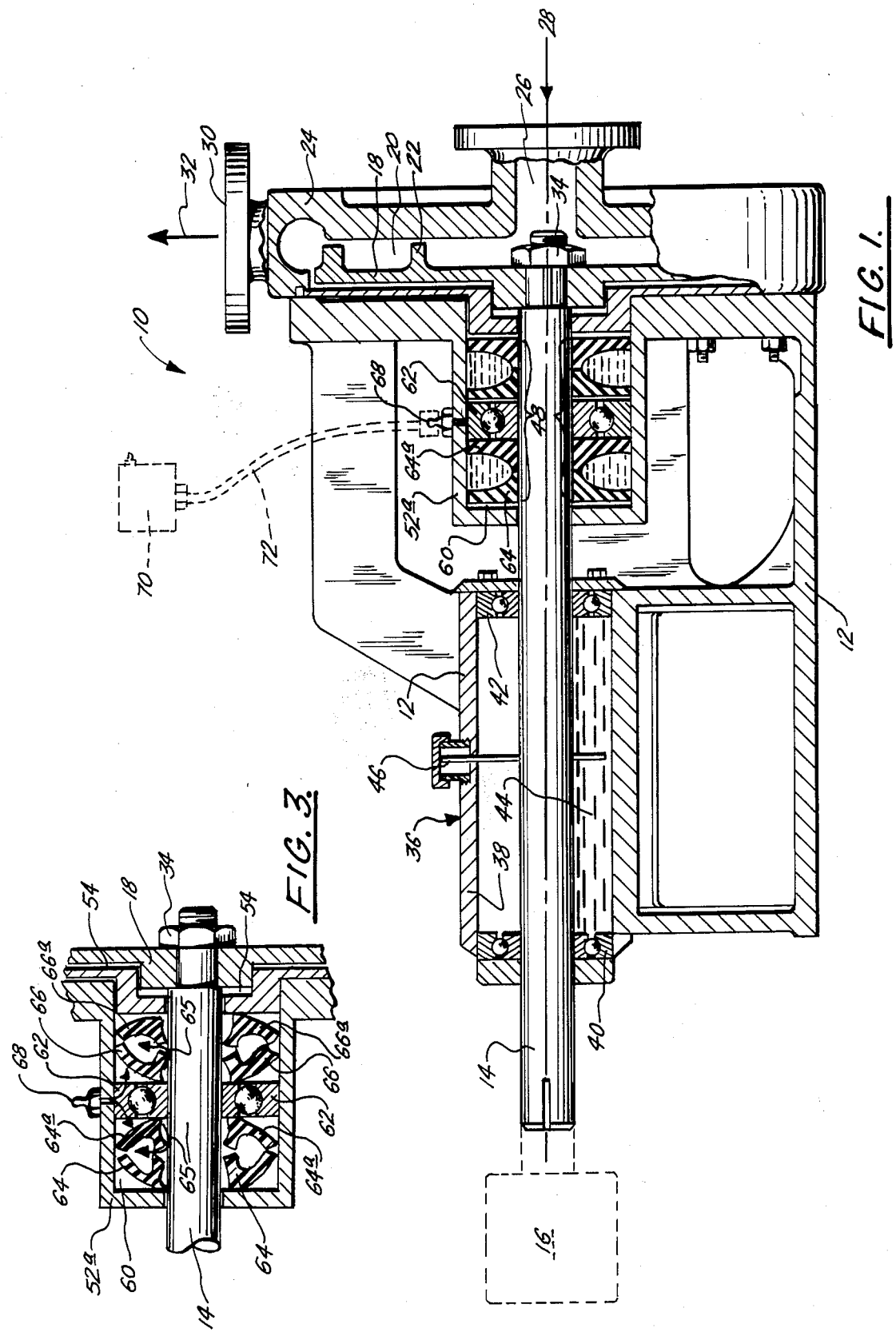
FIG. 1 is a side cutaway view of the present invention illustrating the use of bearings and grease seals in place of the packing material.
Figure 2:
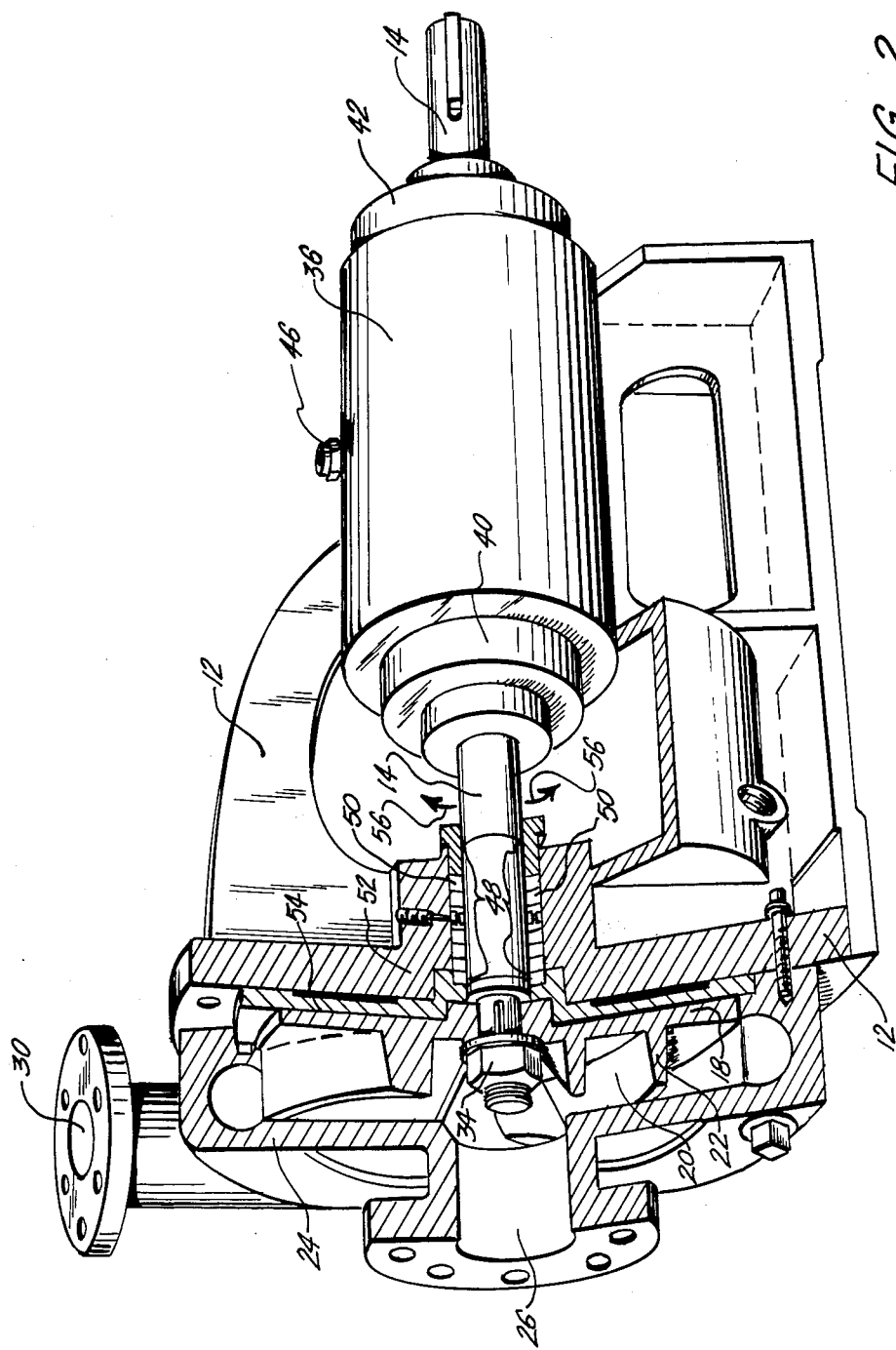
FIG. 2 is a fluid pump apparatus utilizing packing material as the present state of the art.

FIGS. 1 and 3, illustrate by the numeral 10, the improved pump apparatus of the present invention, and FIG. 2 illustrates the present state of the art. In FIG. 1, there is illustrated a pump apparatus 10 which would comprise the pump housing 12 generally forming a housing for shaft member 14 which would extend from motor 16 (not seen) at a first end to impeller blade 18 on a second end, the impeller blade 18 having a series of channels 20 formed by flange members 22, so that upon rotation of impeller blade 18, fluid incoming into impeller housing 24 via port 26 as indicated by ARROW 28, would be routed via rotation of impeller blade 18 for exiting out of exit port 30 into another section of the rig as indicated by arrow 32. Shaft member 14 would be elongated extending as was stated earlier from motor 16 to impeller blade 18, with impeller blade 18 being held in position via nut 34. Housing 12 would be specifically adapted to house shaft member 14 within an oil bath housing 36, on its first end said oil bath which would comprise a housing box 38 having a first oil bearing 40 and a second oil bearing 42 for securing the shaft 14 within the confines of the bearing and effecting rotation. Between bearing 40 and 42 there is provided oil bath 44 which is a typical oil bath for maintaining bearings 40 and 42 in a lubricated state. There is further provided dip stick 46 in order to allow a constant monitoring of the oil level within the oil bath 44.

Referring now to FIG. 2, which represents a partial cutaway side view of the present state of the art in mud pump apparatuses. A comparison of FIG. 1 illustrating the apparatus of the present invention, and FIG. 2 illustrating the present state of the art, should give a clear understanding of the invention and the improvements it has provided. As seen in the FIG. 2, in an area 48 of shaft 14 adjacent the impeller blade 18, shaft 14 is encased in packing material 50 which is a type of packing material which is able to withstand certain temperatures yet allows some sealing and flexibility in its makeup. As seen in the FIGURE, packing material 50 is encased between thickened housing area 52 and shaft 14. The principal feature of packing material 50 is in the event fluid, which is being circulated via impeller blade 18, is allow to seep in that area 54 behind blade 18, fluid 50 will travel along the surface of shaft 14 between packing 50 and the shaft 14 and thus due to particles in the fluid, slightly erode away the packing material around shaft 14. This would cause shaft 14 to be generally unsupported in the area 48 of the shaft, and therefore upon circulation of the fluid through impeller blade 18 may cause a flexing of shaft 14 as seen by arrows 56 which, in the long run, shorten the life span of the shaft and thus the motor itself.

Turning back now to the present invention, as illustrated in FIGS. 1 and 3, the components of the overall apparatus are generally numbered identical to FIG. 1, having explained generally the basic components of a typical fluid pump apparatus, However, the present invention provides an improved means for extending the life of the pump generally in the area along that area of the shaft 48. What is provides is that thickened housing 52 has been bored out to effect a housing wall 52a and thus providing a greater cavity 60 between the surface of shaft 14 and 52a. Also, unlike FIG. 1, the apparatus of the present invention has eliminated the use of packing material due to its erosion properties, and has provided a much improved system for sealing and support. As seen in the FIGURE, there is provided a third set of bearings 62 which is provided in void 60 for rotating between motor housing 52a and shaft 14, and thus providing a stable metalic support on portion 48 of shaft 14. In view of the fact that bearing 62 cannot serve also to seal and eliminate the fluid or the traveling of fluid along shaft 14 in the preferred embodiment, there is further provided a plurality of annular grease seal members 64, 64a and 66, 66a also housed intermediate therein between the wall of housing 52a and shaft 14. As seen in FIG. 1, there is further provided a grease fitting 68, the function of which will be discussed further.

FIG. 3 provides a more detailed view of bearing seal members 64, 64a, 66 and 66a. In FIG. 3, for example, the seals 64, 64a are in a collapsed position, i.e., prior to having grease injected into the annular area 60 via grease fitting 68. Likewise, annular seal members 66, 66a would be in same position prior to that time. Upon the injection of grease into the annular area, as seen by arrows 65 in FIG. 3, the result which is seen in FIG. 1, the grease would encase grease bearing 62, and would travel between housing 52a and grease bearing member 64a, and into annular area 70 and 72 respectively, filling that cavity the result being that seals 64, 64a and 66, 66a would be forced upright into a sealing seal tight position, as seen in FIG. 1. In that position, grease seals 64, 64a and 66, 66a would be in a seal tight position thus eliminating any movement of fluid along shaft 14, and yet allowing grease bearing 62 to be continuously housed and greased for proper functioning. Thus, as an improvement over the present state of the art, the second portion of shaft 14, i.e., area 48 adjacent impeller 18, would thus be held in constant rigid rotation, with no flexing due to the presence of bearing 62, and would be further provided with the plurality of grease seals that would eliminate the need for packing, and thus accomplish a more effective sealing mode to significantly increase the life of the pump during use. It should be noted that although a pair of seals are shown, it is possible that a single seal intermediate bearings 62 and impeller 18 may be adequate to fulfill the task of preventing fluid seepage.

As also seen in FIG. 1, in order to accommodate the constant need for grease to hold grease seals 64, 64a and 66, 66a in rigid upright sealing position, and to maintain bearing 62 well lubricated, there could be provided a grease cylinder 70 which, perhaps under pressure, could maintain a source of grease between grease cylinder 70 and the grease seals via line 72 so that there would be guaranteed a constant source of lubrication and sealing ability of the pump apparatus.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A fluid pump apparatus, comprising:
    a. a pump housing;
    b. a shaft housed longitudinally in said housing;
    c. impeller means at a first end of said shaft for driving fluid pump through said apparatus;
    d. a first pair of oil bearings on the second end of said shaft for allowing free rotation of said shaft during pumping;
    e. a single bearing interposed between said shaft and said housing rigidly supporting said shaft and preventing flexing of said shaft during the pumping;
    f. first and second collapsible U-shaped grease seal members surrounding said shaft, on either side of said bearing member, so that upon being injected internally with grease, said collapsible grease seal members move from an empty non-sealing collapsed position to an upright, grease filled substantially rigid sealing position between the shaft and said housing said grease injected into said grease seal members occupying the space within the U-shaped member; and
    g. means for providing a quantity of grease to the grease seal members at all times during the operation of the pump for maintaining the grease seal members in the upright substantially rigid sealing position during the pumping action.

2. The apparatus in claim 1, wherein said stabilizing means further comprises a bearing interposed between said shaft and said housing for rigidly supporting said shaft during said pumping action.

3. The apparatus in claim 1, wherein said grease seal means further comprises at least a pair of grease seal means on either side of said bearing member.

* * * * *